US008788273B2

(12) United States Patent
Edgar et al.

(10) Patent No.: US 8,788,273 B2
(45) Date of Patent: Jul. 22, 2014

(54) METHOD FOR QUICK SCROLL SEARCH USING SPEECH RECOGNITION

(76) Inventors: Robbie Donald Edgar, Guelph (CA); Luke Stephen Allen, Kincardine (CA); Farhoud Shirzadi, Kitchener (CA)

( * ) Notice: Subject to any disclaimer, the term of this patent is extended or adjusted under 35 U.S.C. 154(b) by 235 days.

(21) Appl. No.: 13/396,771

(22) Filed: Feb. 15, 2012

(65) Prior Publication Data

US 2013/0211842 A1 Aug. 15, 2013

(51) Int. Cl.
*G10L 21/00* (2013.01)
*G10L 25/00* (2013.01)

(52) U.S. Cl.
USPC ............ 704/275; 704/270; 345/156; 345/173

(58) Field of Classification Search
CPC ...................................... G10L 15/22
USPC ................... 704/275; 345/156, 173
See application file for complete search history.

(56) References Cited

U.S. PATENT DOCUMENTS

| 5,600,765 | A  | * | 2/1997  | Ando et al. ............... 345/668 |
| 6,337,694 | B1 | * | 1/2002  | Becker et al. ............. 345/684 |
| 6,351,273 | B1 | * | 2/2002  | Lemelson et al. ......... 715/786 |
| 8,294,683 | B2 | * | 10/2012 | Ranford et al. ............ 345/173 |
| 8,380,499 | B2 | * | 2/2013  | Spaulding et al. ......... 704/231 |
| 2001/0056479 | A1 | | 12/2001 | Miyayama |
| 2002/0169616 | A1 | * | 11/2002 | Brooks et al. ............. 704/275 |
| 2009/0276219 | A1 | | 11/2009 | Yeh et al. |
| 2009/0287626 | A1 | | 11/2009 | Paek et al. |
| 2009/0287650 | A1 | | 11/2009 | Cha |
| 2010/0017381 | A1 | | 1/2010  | Watson et al. |
| 2010/0069123 | A1 | | 3/2010  | Araradian et al. |
| 2010/0105364 | A1 | | 4/2010  | Yang |
| 2010/0105435 | A1 | | 4/2010  | Ueda et al. |
| 2010/0250248 | A1 | * | 9/2010  | Willins ...................... 704/235 |
| 2010/0332226 | A1 | | 12/2010 | Lee et al. |
| 2011/0022393 | A1 | * | 1/2011  | Waller et al. .............. 704/270 |
| 2011/0066423 | A1 | | 3/2011  | Erhart et al. |
| 2011/0087997 | A1 | * | 4/2011  | Lee et al. .................. 715/830 |
| 2011/0205149 | A1 | * | 8/2011  | Tom .......................... 345/156 |
| 2012/0157210 | A1 | * | 6/2012  | Hall .......................... 463/40 |
| 2012/0260168 | A1 | * | 10/2012 | Friedlander et al. ....... 715/716 |
| 2013/0036357 | A1 | * | 2/2013  | Hendrickson ............. 715/728 |

FOREIGN PATENT DOCUMENTS

DE    102009059868 A1    6/2011

OTHER PUBLICATIONS

European search report dated May 6, 2012 from corresponding EP application No. 12155504.9.

(Continued)

*Primary Examiner* — Shaun Roberts
(74) *Attorney, Agent, or Firm* — Gowling Lafleur Henderson LLP; Matthew Roy

(57) ABSTRACT

A method for a computing device to search for data entails receiving first user input that initiates a quick scrolling action and activates a speech recognition subsystem, receiving second user input by recognizing voice input using the speech recognition subsystem to determine a search query, and searching for data that corresponds to the search query. The quick scrolling action and activation of the speech recognition subsystem may be triggered, for example, by a swiping gesture on an optical jog pad, on a touch screen, or on a touch-sensitive mouse, or by a contactless three-dimensional gesture.

18 Claims, 9 Drawing Sheets

(56) References Cited

OTHER PUBLICATIONS http://support.swiftkey.net—hoe can we improve Swiftkey X forum, 2011.

http://www.dexilog.com/smartkeyboard/wiki/Smart_Keyboard—Smart Keyboard: For a better typing experience and FAQ, Jul. 22, 2011.

http://google-chrome-browser.com/tagslgoogel-search, Feb. 8, 2011.

* cited by examiner

METHOD FOR QUICK SCROLL SEARCH USING SPEECH RECOGNITION

CROSS-REFERENCE TO RELATED APPLICATIONS

This is the first application filed for the present technology.

TECHNICAL FIELD

The present technology relates generally to computing devices and, in particular, to voice search techniques.

BACKGROUND

Computing devices are capable of storing large quantities of data. Searching for data files or data items typically entails activating a text-based search function that requires the user to type in one or more search terms. For example, a user wishing to search an inbox for an e-mail from a certain person has to launch a search function and then type in a name or other keyword as a search term. This conventional approach can be inefficient. Accordingly, it would be highly desirable to provide a new technology that would enable searching in a simple and intuitive manner.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
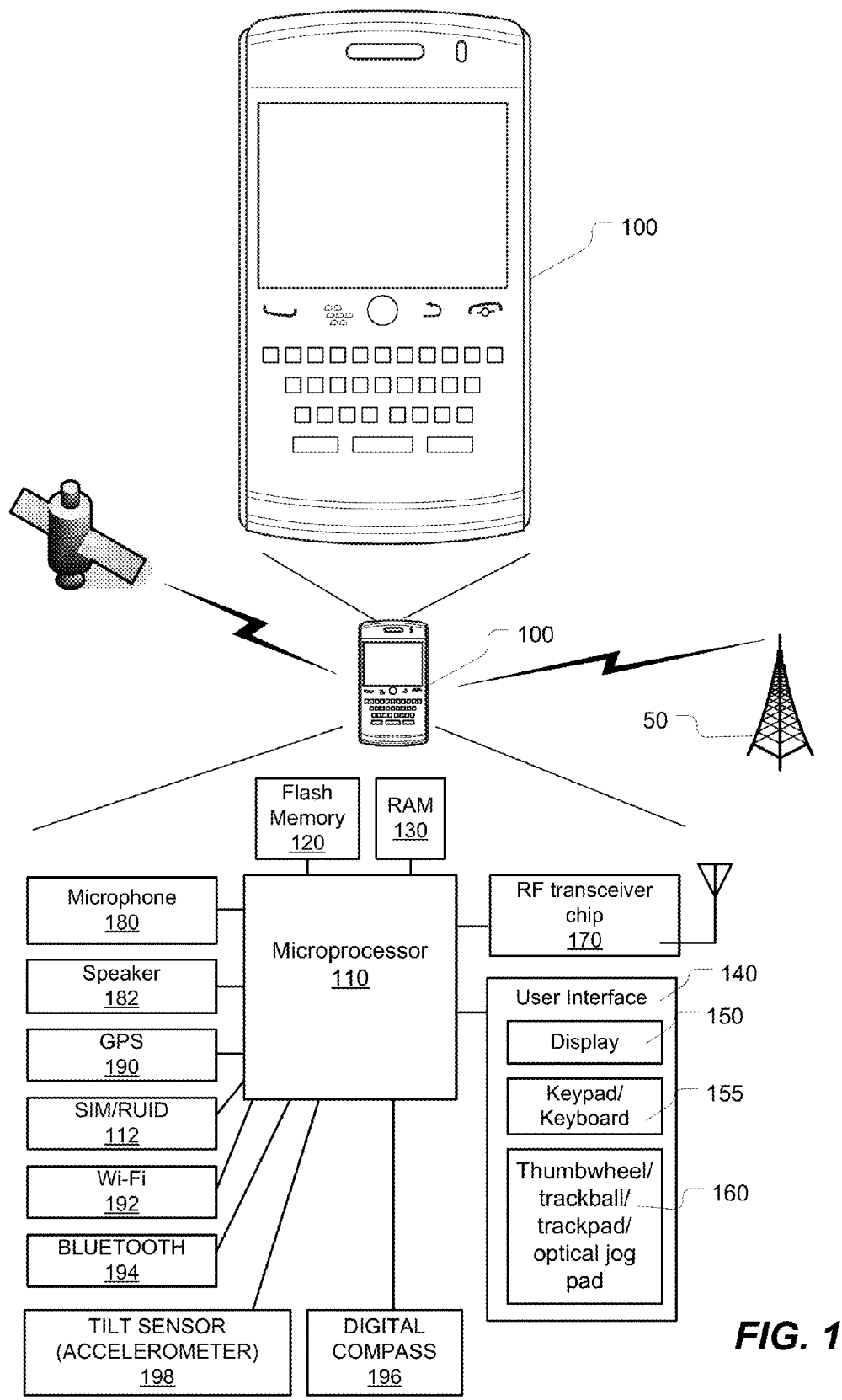
FIG. 1 is a depiction of a mobile device on which the present technology may be implemented, the depiction including a schematic depiction of some components of the mobile device.

The present technology provides a novel way for a computing device to search for data. The novel method, device and computer-readable medium disclosed herein enables the computing device to search for data based on voice input from which the device determines a search query using a speech-recognition subsystem. To trigger, launch or initiate the speech-recognition subsystem that receives and processes the voice input, the device must have already received, or simultaneously receive, a trigger in the form of first user input such as, for example, a swipe gesture on an optical jog pad, touch screen, touch-sensitive mouse or other tactile input. This swipe gesture may cause a quick scrolling action or fast scrolling action through a list of data items that are to be searched, such as e-mails, data files, contacts, etc. The voice input may be received simultaneously with the first user input that triggers the speech-recognition subsystem or while the fast scrolling action is ongoing. With the advent of more reliable speech recognition technology, computing devices, and particularly mobile devices that are already equipped with microphones and speech-recognition software, can thus perform reliable voice searching of data in a manner that is simple, efficient and intuitive.

Accordingly, one aspect of the present technology is a method for a computing device to search for data. The method entails receiving first user input that initiates a quick scrolling action and activates a speech recognition subsystem, receiving second user input by recognizing voice input using the speech recognition subsystem to determine a search query, and searching for data that corresponds to the search query.

Another aspect of the present technology is a computer-readable medium comprising instructions in code which when loaded into a memory and executed by a processor of a computing device cause the computing device to receive first user input that initiates a quick scrolling action and activates a speech recognition subsystem, receive second user input by recognizing voice input using the speech recognition subsystem to determine a search query, and search for data that corresponds to the search query.

Another aspect of the present technology is a computing device having a memory for storing data, a first user input device for receiving first user input that initiates a quick scrolling action and that activates a speech recognition subsystem for receiving voice input as second user input, the speech recognition subsystem determining a search query from the voice input, and a processor operatively coupled to the memory to execute a search function for searching the data in response to the search query.

The details and particulars of these aspects of the technology will now be described below, by way of example, with reference to the drawings.

By way of overview, the present technology enables voice searching to be performed on a computing device in an efficient and intuitive manner. The voice searching is performed in response to a first trigger in the form of first user input, e.g. a swiping gesture, which initiates a quick scrolling through a list of data items while also activating or waking a voice input mode. Voice input can then be received by the device, e.g. via a microphone that feeds voice data representing the voice input to a speech-recognition subsystem on the device that extracts keywords or search terms from the voice data. The voice input may only be received once the voice input mode has been triggered by the first user input that causes the quick scrolling on the device. The voice input may be received simultaneously with the first user input that causes the quick scrolling or immediately after initiating the quick scrolling but while the quick scrolling is still ongoing.

FIG. 1 is a depiction of a mobile device as one example of a computing device. This computing device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the computing device 100 includes a user interface 140 for interacting with device and its applications. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the computing device 100 includes a transceiver 170 for communicating with other devices. The transceiver 170 may be a radiofrequency (RF) transceiver for wirelessly communicating with one or more base stations over a cellular wireless network using cellular communication protocols and standards for both voice calls and packet data transfer such as GSM, CDMA, GPRS, EDGE, UMTS, LTE, etc.

Where the computing device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

Alternatively, where the computing device is a wired device like a desktop computer, laptop, etc., the transceiver 170 of the computing device 100 may be a modem or equivalent (for wired communications) using, for example, the TCP/IP protocol for Internet data communication. The computing device 100 may also include one or more ports for wired connections, e.g. USB, HDMI, FireWire (IEEE 1394), etc.

The computing device 100 includes a speech-recognition subsystem that has a microphone 180 for transforming voice input in the form of sound waves into an electrical signal. The electrical signal is then processed by a speech-recognition module (digital signal processor) to determine keywords or phrases from the voice input.

Optionally, the computing device 100 may include a speaker 182 and/or an earphone jack.

Optionally, the computing device 100 may also optionally include a positioning subsystem such as a Global Positioning System (GPS) receiver 190 (e.g. in the form of a chip or chipset) for receiving GPS radio signals transmitted from one or more orbiting GPS satellites.

Optionally, the computing device 100 may include a Wi-Fi™ transceiver 192, a Bluetooth® transceiver 194, and/or a near-field communications (NFC) chip. The computing device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the computing device may include other sensors like a digital compass 196 and/or a tilt sensor or accelerometer 198.

As noted above, a mobile device or wireless communications device is one example of a computing device 100 on which the present technology may be implemented. Other computing devices 100 may include desktop personal computers, laptops, palmtops, tablets, game consoles, or other such devices having instant messaging capabilities. As noted above, the technologies disclosed herein may be employed on either wireless or wired devices. For example, where the computing device is a personal computer, the user interface may include a keyboard, a mouse that may optionally be touch-sensitive or have a scroll wheel, roller, or equivalent mechanism for scrolling, an LCD or LED displays screen that may or may not be touch-sensitive. The computer may include an embedded or standalone microphone, a headset with a microphone, a webcam with a microphone, etc., any of which can be used to receive the voice input. The computer may optionally include an external stylus pad operating in conjunction with a handwriting recognition software module that recognizes characters or symbols written on the pad using a stylus. Such a pad may also be used by the computer to receive a swipe gesture.

Figure 2:
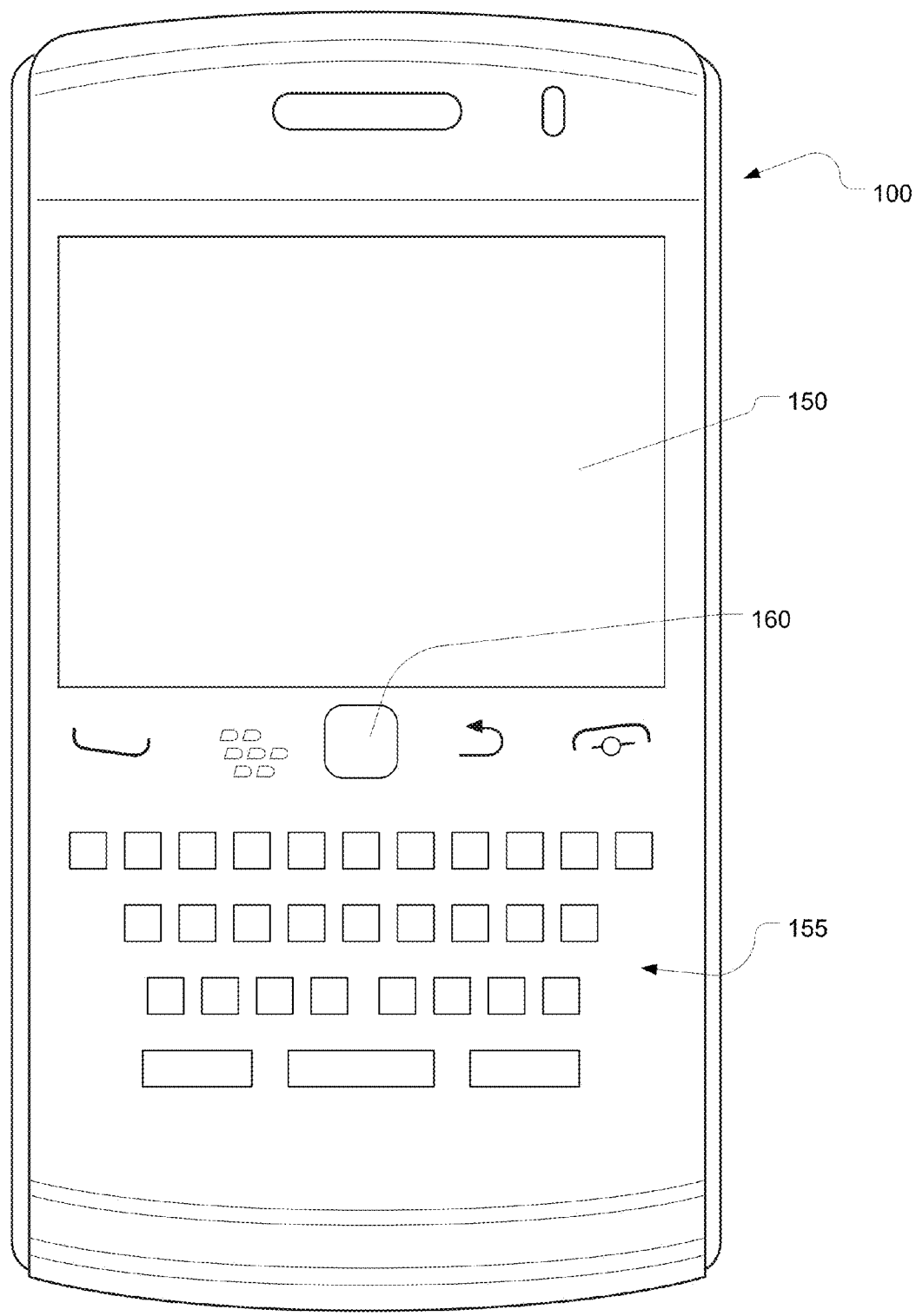
FIG. 2 is a depiction of a mobile device with a keyboard and an optical jog pad as one example of a computing device that may be used to implement the present technology.
Figure 3:
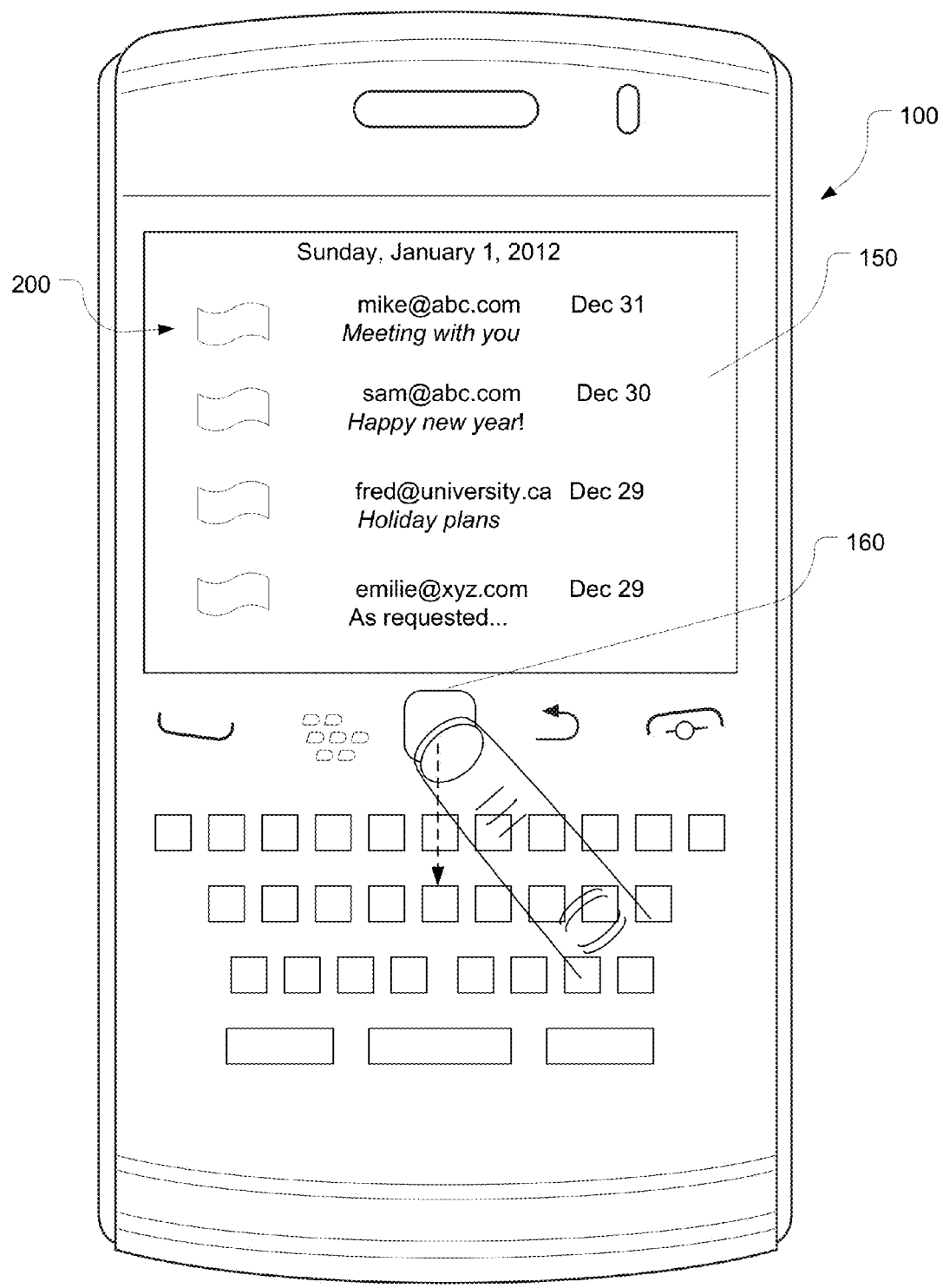
FIG. 3 depicts a swiping gesture on the optical jog pad of the computing device that triggers a quick scrolling action during which time a voice input may be provided to the device to conduct a search on the device.

To implement this novel technology, the memory 120, 130 of the computing device 100 depicted by way of example in FIG. 1 stores data in the form of data files or data items. These data files or data items may be e-mails, text messages, contacts, songs, photos, videos, memos, etc. The processor 110, which is operatively coupled to the memory 120, 130, executes a search function for searching the data for a data file or data item that matches or corresponds to a search query. The user interface 140 includes a first user input device, e.g. an optical jog pad, touch-sensitive mouse, scroll wheel or any other input device that receives input for causing a fast scroll or quick scroll through a list of items, objects, files, messages, etc. As shown by way of example in FIG. 2, the device may have an optical jog pad 160, track pad, or other tactile input device for receiving the first input. While the fast scrolling occurs, the user speaks audibly to provide voice input to the computing device 100. The receipt of first user input on the optical jog pad 160 causing the quick scrolling is depicted by way of example in FIG. 3. The tactile input and the voice input are co-triggers (either coincidental or staggered) that launch the voice-based search. The computing device 100 has a speech-recognition subsystem (speech recognition data processor) capable of recognizing speech in one or more preset languages. Voice input provided by the user to the computing device is converted into a search query (i.e. a search command with the user-specified search string). A search is then performed through the list or other organized data collection for the keyword or keywords. An example search through a mailbox is depicted by way of example in FIG. 3. In this example, the voice input spoken by the user is "Emilie" to search for an e-mail sent by Emilie. The voice input is processed by the speech-recognition subsystem to define a search query "Emilie". The search is then performed through the data items (e-mails) listed in the inbox. The first instance of "Emilie" in the mailbox is then displayed by, for example, highlighting or otherwise emphasizing the search result. If no search result is found, then a statement to that effect may be presented. The device may optionally prompt the user to repeat the name or keyword for the speech-recognition subsystem.

Figure 4:
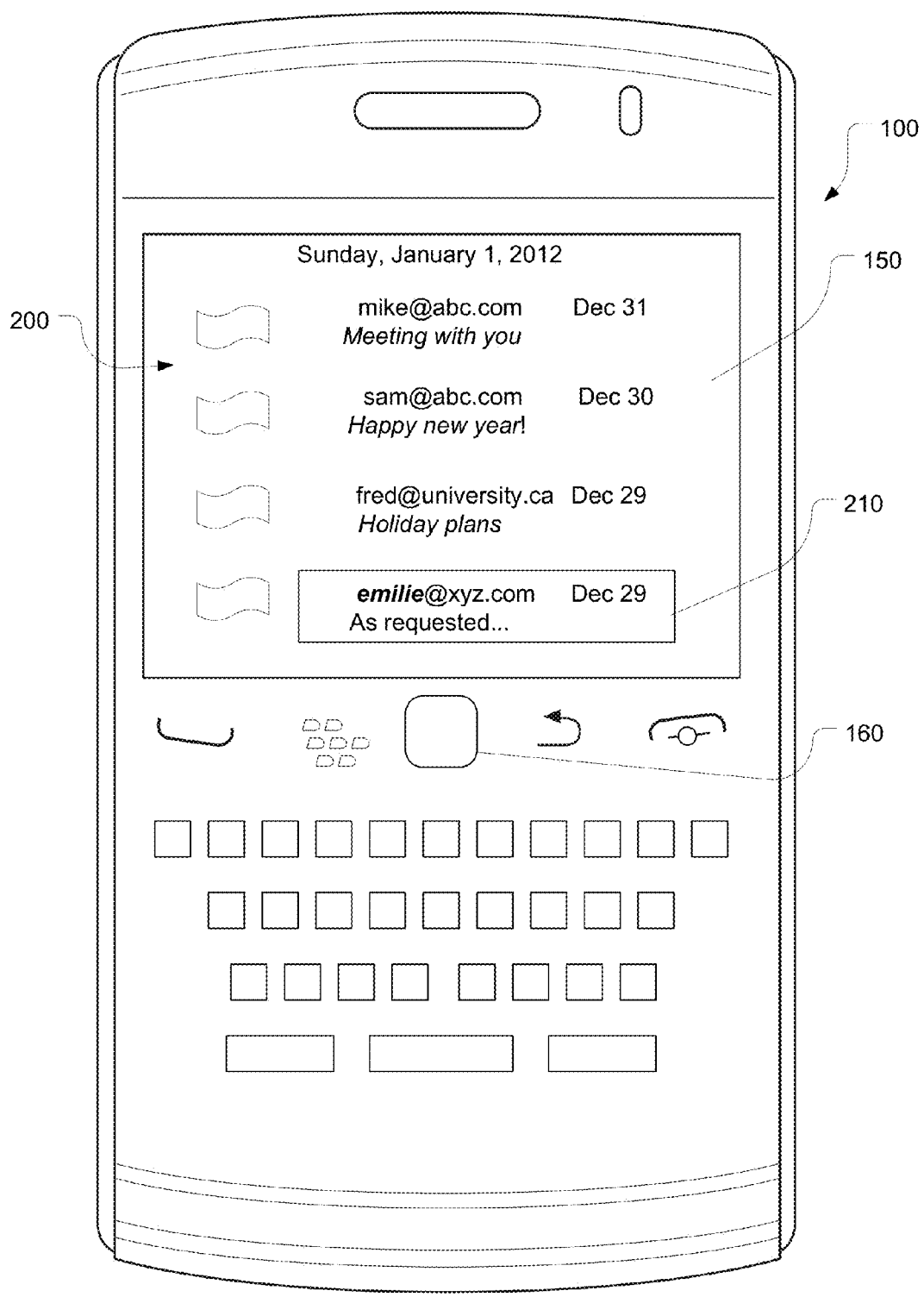
FIG. 4 depicts an example search performed through a mailbox of a mobile device having an optical jog pad.
Figure 5:
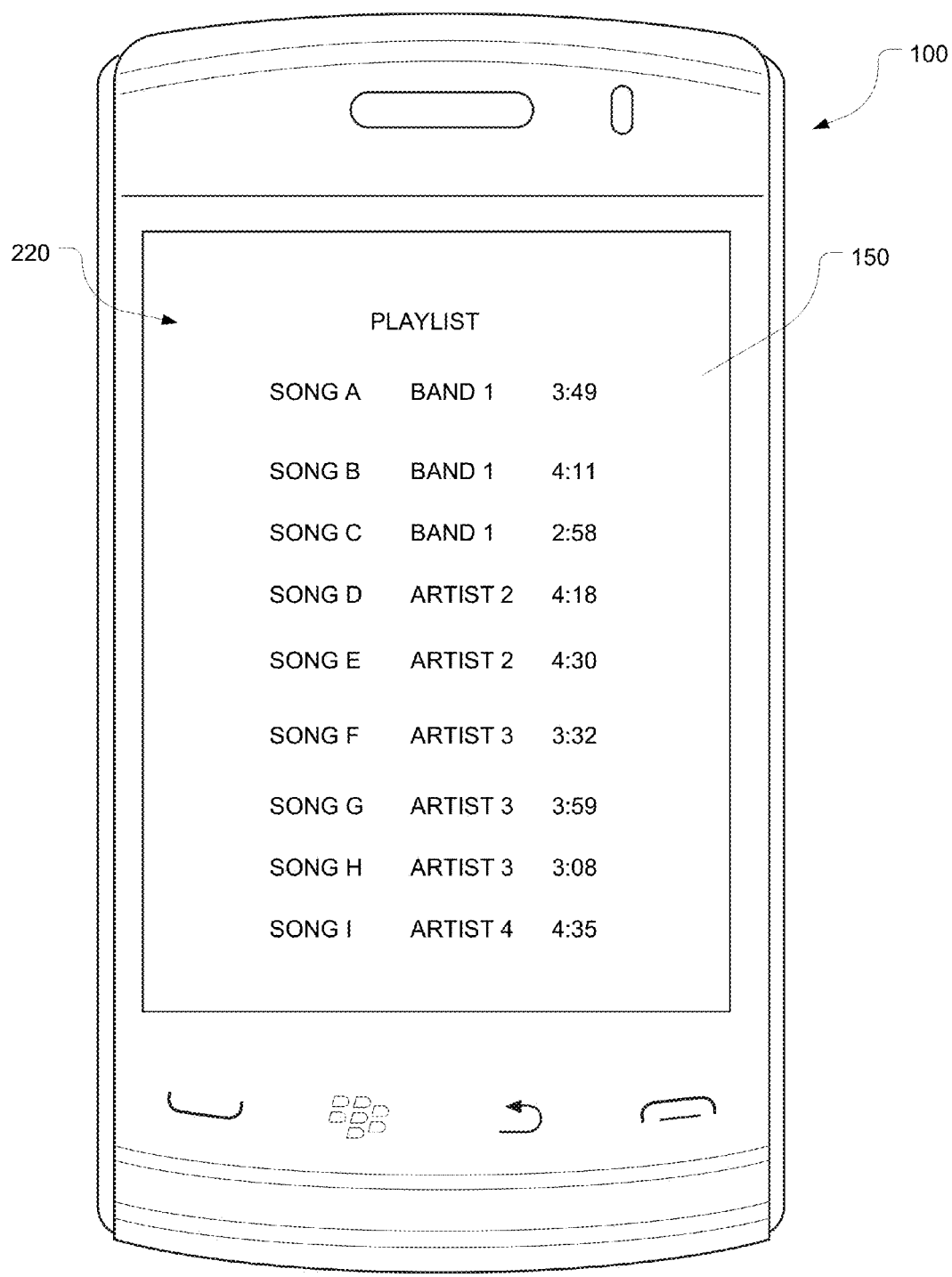
FIG. 5 is a depiction of a touch-sensitive mobile device as another example of a computing device on which the present technology may be implemented.
Figure 6:
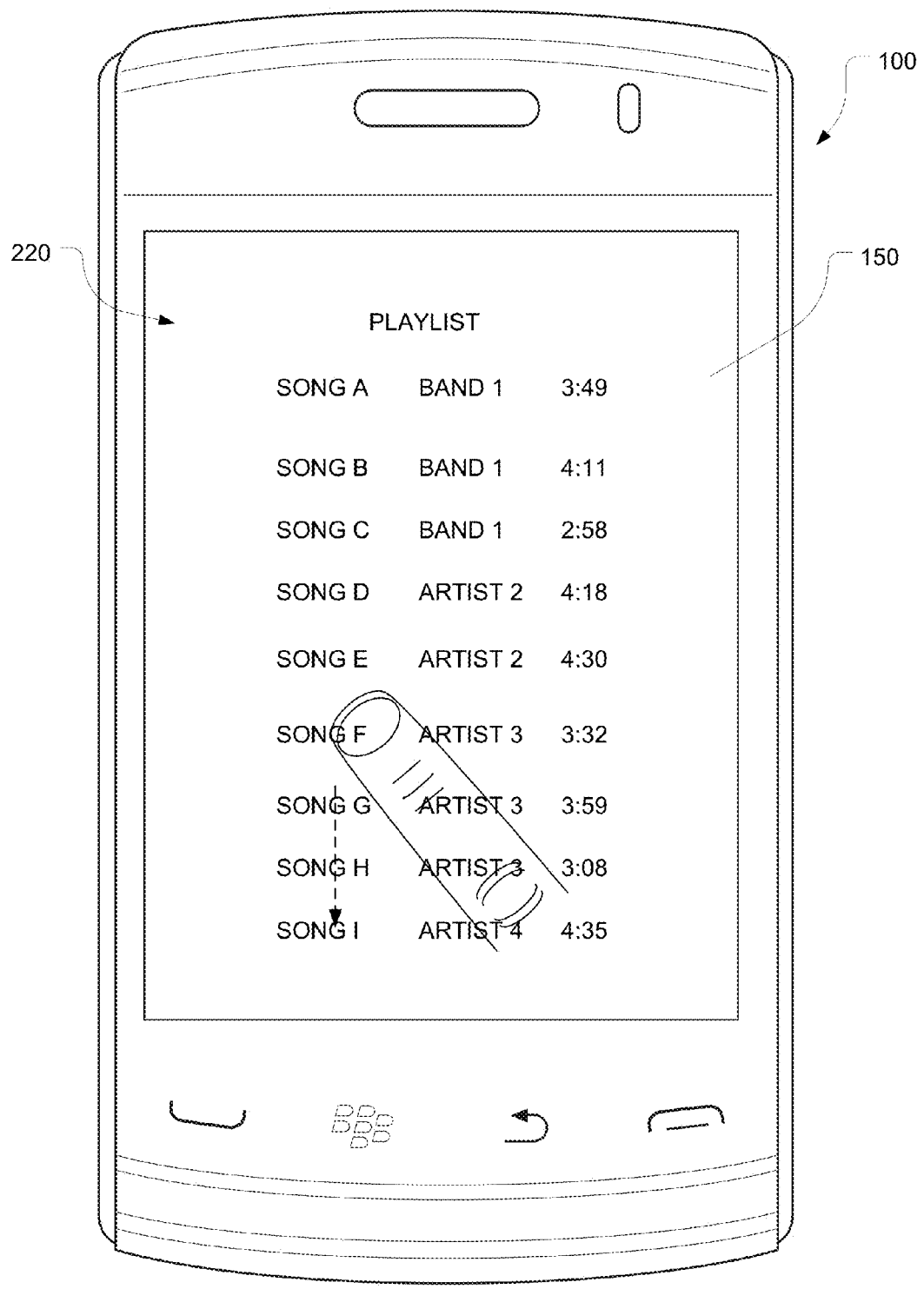
FIG. 6 depicts a swiping gesture on the touch screen of the computing device that triggers a quick scrolling action during which time a voice input may be provided to the device to conduct a search on the device.

The computing device 100 may also be a touch-screen mobile device such as the one depicted by way of example in FIG. 4. The first user input that triggers the quick scroll may thus be a swiping gesture directly on the touch screen 150 as depicted by way of example in FIG. 5. In the example depicted in FIG. 5, the touch screen displays a playlist of songs. The playlist may list the title of the song, the album, the artist/band, the genre, the duration of the song and possibly other information. To search through the playlist for a song, album, artist, etc., the user swipes the touch screen as shown by way of example in FIG. 6. This triggers the quick scroll and the voice input mode. The user then speaks the name of the song, album, artist, etc. either simultaneously with the swiping gesture or while the playlist is still scrolling in response to the swiping gesture. This voice input is received by the microphone 180 on the device 100, converted into a digital signal, and then processed by a digital signal processor within the speech-recognition subsystem to generate a search query.

Figure 7:
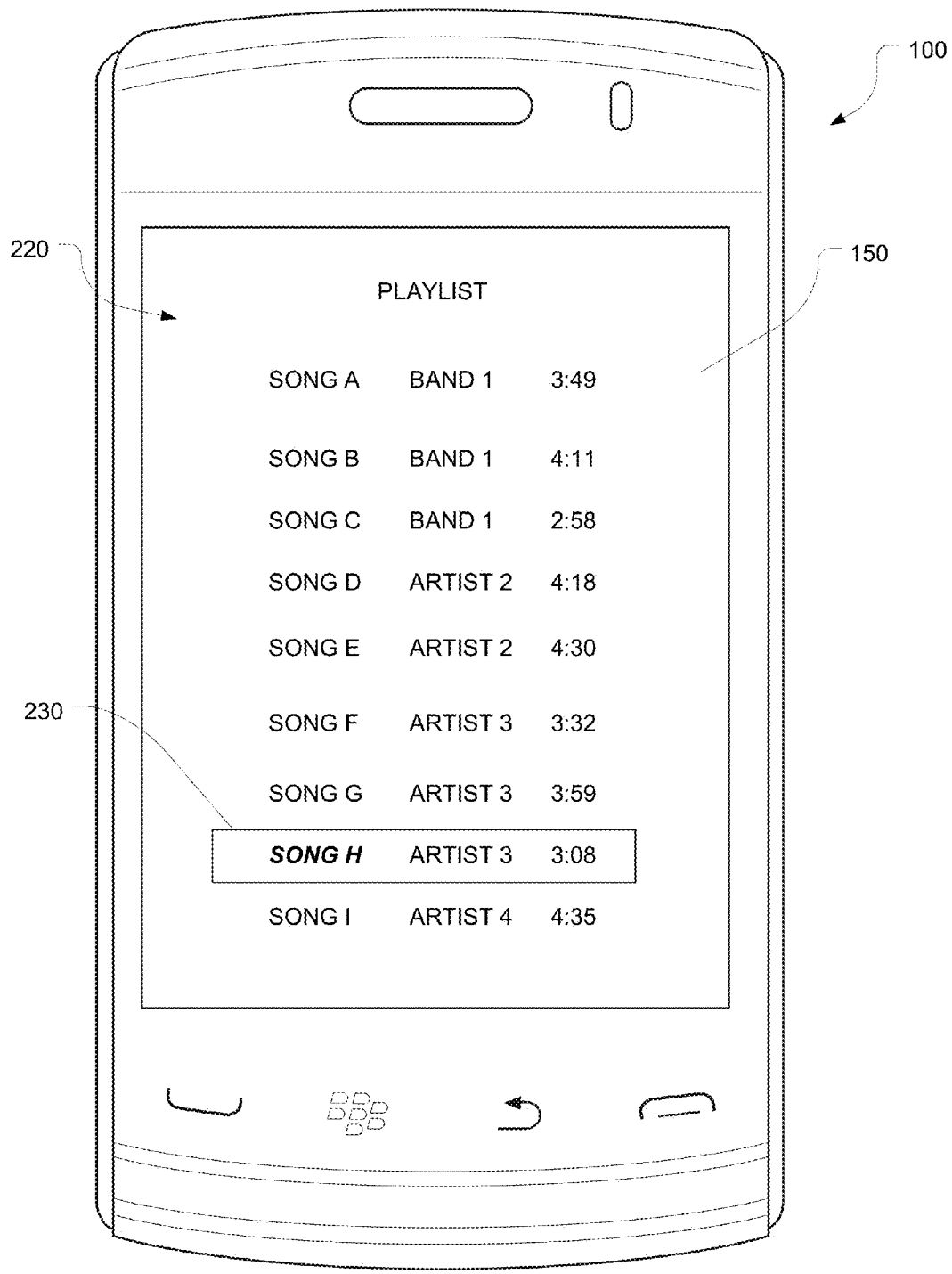
FIG. 7 depicts an example search performed through a playlist of songs on a touch-screen mobile device.

This search query is then used to perform a search through the playlist for a song, album, artist, etc. that matches the search query. For example, if the user spoke the keyword "Song H", a search would be performed and the first instance of "Song H" would be highlighted or otherwise displayed on the display as shown by way of example in FIG. 7.

Figure 8:
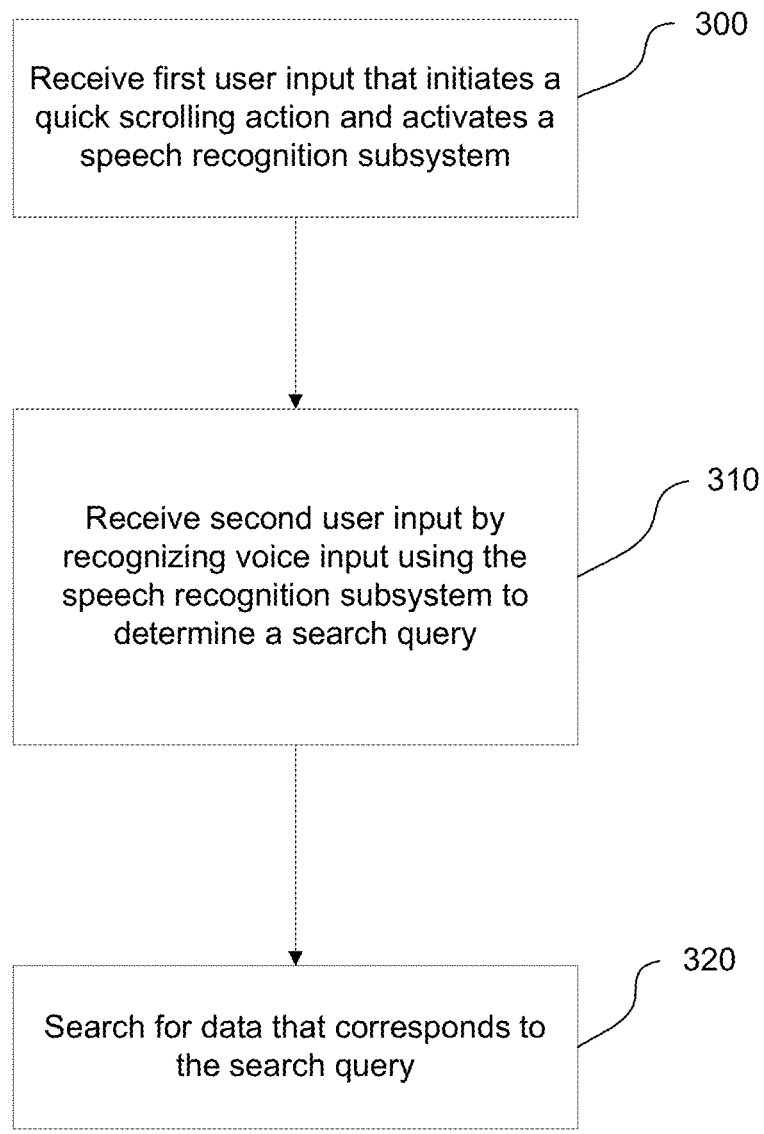
FIG. 8 is a flowchart depicting a method performed by the computing device in accordance with one implementation of the present technology.
Figure 9:
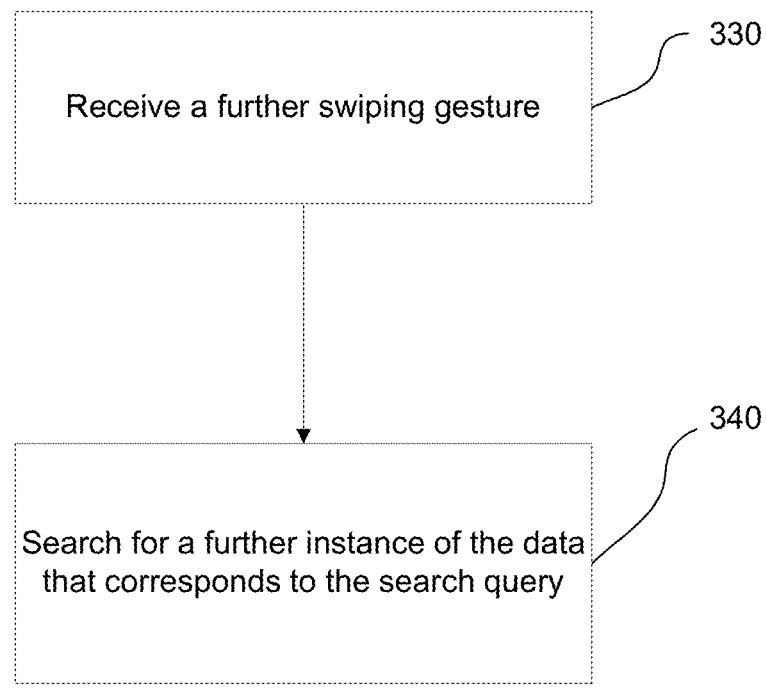
FIG. 9 is a flowchart depicting a further method performed by the computing device in accordance with another implementation of the present technology.

This technology enables novel methods of searching for data. In general, and as depicted in FIG. 8, the method entails receiving first user input that initiates a quick scrolling action and activates a speech recognition subsystem, receiving second user input by recognizing voice input using the speech recognition subsystem to determine a search query, and searching for data that corresponds to the search query. As further and related method, which is depicted in FIG. 9, entails receiving a further swiping gesture and searching for a further instance of the data corresponding to the search query.

Fast scrolling or quick scrolling is responsive to first user input. This first user input triggers, launches or initiates fast scrolling. The fast scrolling may be actuated by a swiping gesture of a finger or thumb, or of any object like a stylus. Fast scrolling causes scrolling through a list of data items like e-mail messages or other data files that may be organized in a list or any other such searchable structure. Fast scrolling is distinguished from normal scrolling by the nature or characteristics of the input received by the user input device. A swipe or swiping gesture that exceeds a predetermined threshold of swiping speed will be interpreted by the device to be input requesting a fast scrolling action whereas a swipe below the predetermined threshold will be interpreted as a request for normal scrolling. Normal scrolling will typically cause the items to scroll one by one in direct proportion to the input motion provided. Fast scrolling, in contrast with normal scrolling, will cause the items to scroll very rapidly at the outset, sometimes so fast that items are initially an unintelligible blur to the user. The fast scrolling action will gradually slow down until the scrolling comes to a stop. When the fast scrolling action is launched, the data items will scroll for a predetermined time or a predetermined number of items will scroll. In a variant, the amount of scrolling is proportional to the speed of the swiping gesture. The fast scrolling performance may be user-configurable. For example, the sensitivity (i.e. the threshold for triggering fast scrolling) may be configurable. The number of items scrolled per fast scrolling event, the scrolling time per event, whether fast scrolling is fixed or proportional to input swiping speed, and other such performance characteristics may also be user-configurable.

If the list of data items is short, then the fast scrolling action may involve looping or cycling through the list such that when the bottom of the list is reached, the scrolling continues seamlessly from the top of the list (to create an endless loop effect).

The fast scrolling/quick scrolling action may optionally be accompanied by a visual indicator (e.g. an hourglass icon, a progress bar, a word "searching . . . ", an LED light blinking, etc.)

In one implementation, the act of receiving the first input comprises receiving a swipe or swiping gesture. In one specific implementation, to trigger the search, the first input and the second input must be received substantially simultaneously. In an alternative implementation, the second input must be received while the quick scrolling action is ongoing to trigger the search. In yet a further alternative implementation, the second input may be received either substantially simultaneously with the first input or it may be received while the quick scrolling action is ongoing in order to trigger the search.

The first user input may be received in any one of various forms. For example, in one embodiment, the first input may be a swiping gesture received on an optical jog pad. In other words, the first user input device may be an optical jog pad or any other equivalent or similar input device like a track pad, thumbwheel, mouse wheel, etc.

In another embodiment, the first input may be a swiping gesture on a list of items displayed on a touch screen. For example, a touch screen device may display a playlist of songs. To search for a particular song title or artist, the user triggers the voice search by performing a swiping gesture on the list of songs to cause a quick scrolling through the list of songs. Either concurrently with the swiping gesture or while the songs are still scrolling, the user speaks the title of the song or the name of the artist. This voice input is processed by the speech-recognition subsystem to generate a keyword or alphanumeric search string. A search query with the keyword or alphanumeric search string is then formulated. A search is then performed through the playlist of songs for a first instance of the song or artist that matches the search query (keyword or search string). Assuming there is at least one match, the search result is then displayed. Displaying of the search result may entail highlighting the first instance of the search result in the list. Search results may be presented in any other known manner, such as presenting a separate search result page or window showing all the search results. In the example of a playlist, the search result would highlight the first song or artist that matches the search query. In the example of a mailbox (inbox, sent items box, deleted items box, etc.) containing a list of e-mails, the search result may be displayed by highlighting the e-mail or portion of the e-mail that matches the search query.

In one implementation, a further search for another instance of the data matching the search query may be efficiently performed by receiving a further swiping gesture. This further swiping gesture causes the device to conduct a search for a further instance of the data corresponding to the search query. In other words, a further user input (e.g. further swipe) causes the device to search for a next instance of data that matches the search query, e.g. the next e-mail, song or other data file that matches the search query as defined by the voice input). In one variant, a downward swipe causes a search down the list while an upward swipe causes a search up the list. Similarly, left and right swipes might be used to search a set of data files arranged horizontally, i.e. left to right (e.g. a set of image thumbnails). For example, a right swipe might be used to search the data files toward the right whereas a left swipe might be used to search the data files toward the left. These examples illustrate how a direction of the swipe may be used to determine whether a search is performed forward or backward through a list or other arrangement of data files.

In another embodiment, the first input may be a swiping gesture on a touch-sensitive mouse. Alternatively, a mouse with a scroll wheel or roller may be used to initiate a quick scrolling action.

In another embodiment, the first input may be a contactless swiping gesture detectable by a contactless gesture recognition system. A contactless gesture recognition system may use proximity sensors to enable a user to interact with the computing device using intuitive gestures without actually touching the screen or holding any additional device.

It should be appreciated from these foregoing examples that various input devices may be used to trigger the quick scrolling and the voice search function. It should also be appreciated that this novel search technique may be used to search for all sorts of data items including, but not limited to, e-mail messages, text messages, SMS messages, notifications or transcriptions of voice mail messages, songs, photos, videos, memos, contacts, web pages, Microsoft Office documents, Adobe PDF documents, or any other data files whether they are in a list format or not. Searching of data may optionally include searching any metadata. In addition, this technology may be used to search not just for files not also for folders or any other data items on the computing device. Search queries may include names, words, numbers, dates, times, file types or any keyword or phrase that may be spoken by the user.

The novel search techniques disclosed herein may also be used in other ways to search through data. For example, the novel search technique may be used to initiate a search of data content stored on a connected device (be it a paired device or a device communicatively connected via a data network such as the Internet). In other words, this search technique may be employed to search through a list of data items stored in a remote database in a client-server relationship, in a peer-to-peer relationship or any other relationship.

This novel search technique may be employed to conduct a search through a list of web search results obtained by using a search engine.

This novel search technique may be employed to search through the content of a document, e.g. a Word document, Excel spreadsheet, PowerPoint, PDF, HTML document, etc., by initiating a fast scroll action through the document and then speaking the keyword for the speech-recognition subsystem to recognize as a search query. This technique may be used as a "find" or "locate" function inside a document. The direction of the swiping gesture may optionally be used to determine whether to search down (i.e. forward) through the document or up (i.e. backward) through the document.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method for a computing device to search for data, the method comprising:
   receiving first user input that initiates a quick scrolling action and activates a speech recognition subsystem;
   receiving second user input by recognizing voice input using the speech recognition subsystem to determine a search query, wherein receiving the second input occurs while the quick scrolling action is ongoing; and
   searching for data that corresponds to the search query.

2. The method as claimed in claim 1 wherein receiving the first input comprises receiving a swiping gesture.

3. The method as claimed in claim 2 comprising:
   receiving a further swiping gesture; and
   searching for a further instance of the data corresponding to the search query.

4. The method as claimed in claim 1 wherein receiving the first input comprises receiving a swiping gesture on an optical jog pad.

5. The method as claimed in claim 1 wherein receiving the first input comprises receiving a swiping gesture on a list of items displayed on a touch screen.

6. The method as claimed in claim 1 wherein receiving the first input comprises receiving a swiping gesture on a touch-sensitive mouse.

7. The method as claimed in claim 1 wherein receiving the first input comprises receiving a contactless swiping gesture detectable by a contactless gesture recognition system.

8. A non-transitory computer-readable medium comprising instructions in code which when loaded into a memory and executed by a processor of a computing device cause the computing device to:
   receive first user input that initiates a quick scrolling action and activates a speech recognition subsystem;
   receive second user input by recognizing voice input using the voice recognition subsystem to determine a search query, wherein the second input is received while the quick scrolling action is ongoing; and
   search for data that corresponds to the search query.

9. The computer-readable medium as claimed in claim 8 wherein the code for receiving the first input comprises code for receiving a swiping gesture.

10. The computer-readable medium as claimed in claim 9 comprising code to cause the device to:
    receive a further swiping gesture; and
    search for a further instance of the data corresponding to the search query.

11. The computer-readable medium as claimed in claim 8 wherein the code for receiving the first input comprises code for receiving one of: a swiping gesture on an optical jog pad, a swiping gesture on a list of items displayed on a touch screen, a swiping gesture on a touch-sensitive mouse and a contactless swiping gesture in proximity to a contactless user input device.

12. A computing device comprising:
    a memory for storing data;
    a first user input device for receiving first user input that initiates a quick scrolling action and that activates a speech recognition subsystem for receiving voice input as second user input received while the quick scrolling action is ongoing, the speech recognition subsystem determining a search query from the voice input; and a processor operatively coupled to the memory to execute a search function for searching the data in response to the search query.

13. The computing device as claimed in claim 12 wherein the first user input device is a tactile input device for receiving a swiping gesture.

14. The computing device as claimed in claim 13 wherein the processor searches for a further instance of the data corresponding to the search query in response to a further swiping gesture received by the first user input device.

15. The computing device as claimed in claim 12 wherein the first user input device is an optical jog pad.

16. The computing device as claimed in claim 12 wherein the first user input device is a touch screen displaying a list of items.

17. The computing device as claimed in claim 12 wherein the first user input device is a touch-sensitive mouse.

18. The computing device as claimed in claim 12 wherein the first user input device is a contactless gesture recognition system.

\* \* \* \* \*